(12) United States Patent
Geraci et al.

(10) Patent No.: US 10,897,768 B2
(45) Date of Patent: Jan. 19, 2021

(54) ALLOCATION OF ORTHOGONAL RESOURCES TO USER EQUIPMENT

(71) Applicant: Nokia Technologies Oy, Espoo (FI)

(72) Inventors: Giovanni Geraci, Dublin (IE); David Lopez-Perez, Dublin (IE); Holger Claussen, Dublin (IE)

(73) Assignee: Nokia Technologies Oy, Espoo (FI)

( * ) Notice: Subject to any disclaimer, the term of this patent is extended or adjusted under 35 U.S.C. 154(b) by 8 days.

(21) Appl. No.: 16/336,533

(22) PCT Filed: Sep. 25, 2017

(86) PCT No.: PCT/EP2017/074235
§ 371 (c)(1),
(2) Date: Mar. 26, 2019

(87) PCT Pub. No.: WO2018/055163
PCT Pub. Date: Mar. 29, 2018

(65) Prior Publication Data
US 2019/0239231 A1    Aug. 1, 2019

(30) Foreign Application Priority Data

Sep. 26, 2016  (EP) .................................... 16190569

(51) Int. Cl.
*H04W 72/08* (2009.01)
*H04L 5/00* (2006.01)

(52) U.S. Cl.
CPC ........... *H04W 72/08* (2013.01); *H04L 5/0048* (2013.01); *H04L 5/0058* (2013.01); *H04L 5/0069* (2013.01)

(58) Field of Classification Search
CPC .... H04W 72/08; H04L 5/0048; H04L 5/0059; H04L 5/0069
See application file for complete search history.

(56) References Cited

U.S. PATENT DOCUMENTS

2010/0238877 A1* 9/2010 Nam ..................... H04L 5/0048
370/329
2012/0088522 A1* 4/2012 Mills ..................... H04W 64/00
455/456.2

(Continued)

FOREIGN PATENT DOCUMENTS

| WO | WO 2014/046577 A1 | 3/2014 |
| WO | WO 2014/191704 A1 | 12/2014 |
| WO | WO 2016/036158 A1 | 3/2016 |

OTHER PUBLICATIONS

Italo Atzeni et al., "Fractional Pilot Reuse in Massive MIMO Systems," Workshop on 5G and Beyond—Enabling Technologies and Applications, IEEE ICC, pp. 1030-1035, 2015.

(Continued)

*Primary Examiner* — Kodzovi Acolatse
(74) *Attorney, Agent, or Firm* — Fay Sharpe LLP

(57) ABSTRACT

A method of allocating orthogonal resources, a computer program for so doing, a network node and network control node are disclosed. One method comprises determining user equipment within a radio cell of the network node that are considered to be edge user equipment located towards an edge of the radio cell and user equipment that are considered to be centre user equipment located towards a centre of the radio cell. Allocating a subset of the set of resources to the edge user equipment and allocating resources from the set of resources that are not allocated to the edge user equipment to the centre user equipment; and indicating to at least some adjacent network nodes that the subset of the resources is not available to the adjacent network node for allocation to edge user equipment.

10 Claims, 4 Drawing Sheets

(56) References Cited

U.S. PATENT DOCUMENTS

| | | | | |
|---|---|---|---|---|
| 2012/0120888 A1* | 5/2012 | Miao | ............... | H04B 1/7143 |
| | | | | 370/329 |
| 2012/0244871 A1* | 9/2012 | Zhao | ............... | H04W 16/10 |
| | | | | 455/452.1 |
| 2014/0073338 A1 | 3/2014 | Lioulis et al. | | |
| 2014/0274079 A1* | 9/2014 | Li | ............... | H04W 72/04 |
| | | | | 455/450 |
| 2016/0073429 A1* | 3/2016 | Oteri | ............... | H04W 4/08 |
| | | | | 370/338 |

OTHER PUBLICATIONS

Emil Bjornson et al., "Massive MIMO for Maximal Spectral Efficiency: How Many Users and Pilots Should Be Allocated?" IEEE Transactions on Wireless Communications, vol. 15, No. 2, pp. 1293-1308, Feb. 2016.

Thomas L. Marzetta, "Massive MIMO: An Introduction," Bell Labs Technical Journal, vol. 20, pp. 11-22, 2015.

Xudong Zhu et al., "Soft Pilot Reuse and Multicell Block Diagonalization Precoding for Massive MIMO Systems," IEEE Transactions on Vehicular Technology, vol. 65, No. 5, pp. 3285-3298, May 2016.

International Search Report for PCT/EP2017/074235 dated Nov. 17, 2017.

\* cited by examiner

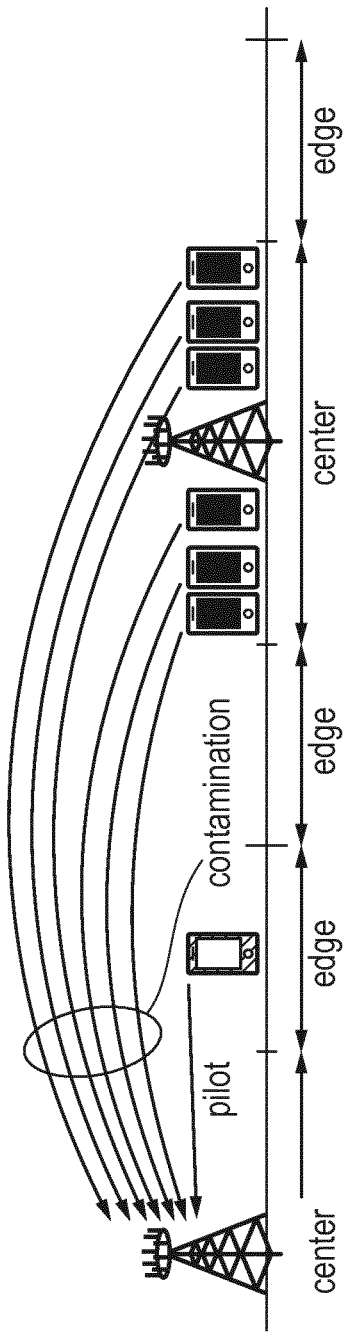
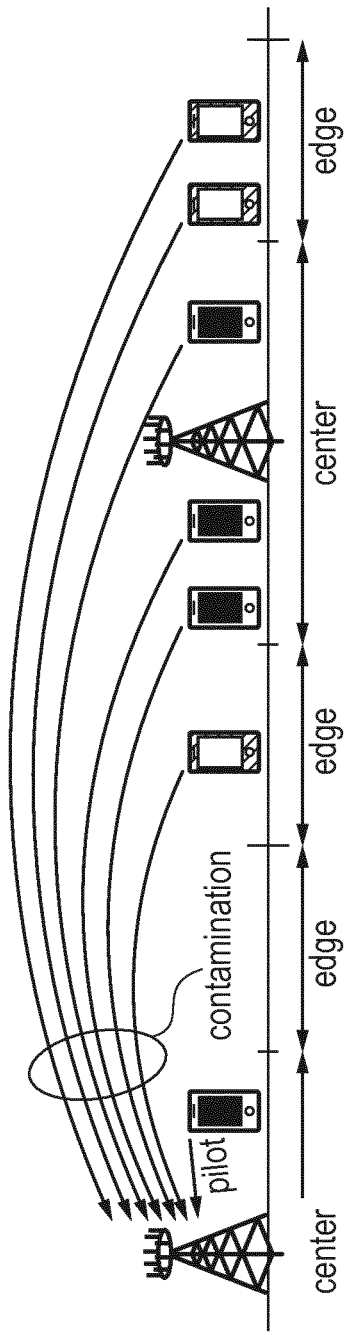

ALLOCATION OF ORTHOGONAL RESOURCES TO USER EQUIPMENT

FIELD OF THE INVENTION

The field of the invention relates to the allocation of orthogonal resources for use by user equipment when transmitting signals towards network nodes.

BACKGROUND

With the increasing number of user equipment being served by network nodes there is a corresponding increase in the requirement for resources for use in the transmission of signals. In order to avoid interference between signals, orthogonal resources may be used by user equipment in the same cell. Furthermore, user equipment in neighbouring cells may also generate signal interference where non-orthogonal resources are used for these signals.

Although this may be a problem in uplink communication in general, it is a particular problem for pilot signal transmission. Pilot signals are broadcast by user equipment to enable the network node to perform channel state estimation. Many techniques used for reducing noise and separating out the original signal in uplink data communications are not applicable with pilot signals and thus, contamination from other pilot signals transmitted by nearby user equipment on non-orthogonal resources can be a significant factor in reducing the accuracy of channel estimation.

The performance of network systems such as massive MIMO rely on the channel state information acquired at each base station (BSs) in order to be able to provide accurate uplink data signal separation.

Channel estimation is obtained during the so-called training phase, where some resource elements (REs), i.e. time-frequency resource units, are used for the transmission of pilot signals. The remaining REs are used for payload data and are split between uplink and downlink transmissions, as illustrated in FIG. 1. Since the number of pilots, i.e., the number of REs allocated to the training phase, is limited, these pilots must be reused across cells. Pilot resource reuse implies that the estimate for the channel between a BS and one of its users (UEs) may be contaminated by the channels between the BSs and UEs in other cells which share the same pilot.

Pilot contamination is regarded as the main limiting factor for the performance of massive MIMO. In order to mitigate such phenomenon, non-universal pilot reuse has been proposed, where neighboring cells use different sets of mutually orthogonal pilots. While reducing the effect of pilot contamination, non-universal pilot reuse schemes significantly limit the number of UEs that can be trained and subsequently served during the data transmission phase. Such limitation has a detrimental effect on the cell throughput.

It would be desirable to be able to allocate resources to user equipment in an efficient way while still limiting signal interference or contamination.

SUMMARY

A first aspect of the present invention provides a method performed at a network node of allocating a set of orthogonal resources to user equipment for transmitting signals to said network node, said method comprising: determining user equipment within a radio cell of said network node that are considered to be edge user equipment located towards an edge of said radio cell and user equipment that are considered to be centre user equipment located towards a centre of said radio cell; allocating a subset of said set of orthogonal resources to said edge user equipment and allocating resources from said set of orthogonal resources that are not allocated to said edge user equipment to said centre user equipment; and indicating to at least some adjacent network nodes that said subset of said resources is not available to said adjacent network node for allocation to edge user equipment.

The inventors of the present invention recognised that although the reuse of resource in neighbouring cells can lead to signal contamination, this can be mitigated where edge user equipment in at least some of the neighbouring cells are restricted from using the same resource. User equipment towards the centre of the radio cell may not face such restrictions as signals from this equipment are far less likely to affect user equipment in other cells. However, edge user equipment may be close to other edge user equipment and were they to be provided with the same or non-orthogonal resources a high degree of signal contamination could result.

Thus, the network node allocates a subset from a set of orthogonal resources to edge user equipment and it transmits a signal restricting this subset from being allocated to user equipment in at least some neighbouring or adjacent cells. In this simple way, interference is reduced while restriction on the allocation of resources to user equipment is not greatly increased and reuse of resource in neighbouring cells is, with some restrictions, permitted.

Depending on the number of subsets a set of orthogonal resources is divided into, all adjacent cells may use different subsets of resources for their edge user equipment, or alternatively a majority or perhaps simply some adjacent cells may face this restriction. In all cases performance will be improved over there being no such restriction, however, where some adjacent network nodes are permitted to provide the non-orthogonal resources to edge user equipment some increase in signal contamination may result.

Adjacent network nodes are network nodes which share a border, such that a user equipment served by one of these network nodes will move directly to the "adjacent" network node without passing through a cell served by a further network node. A user equipment is served by a network node when the signal from that network node is stronger than signals from other network nodes, it will cross the cell boundary and be served by a different network node when the signal strength from that network node exceeds the signal from its serving network node.

In some embodiments, said set of orthogonal resources is divided into predetermined subsets and said step of allocating said subset comprises selecting any one of said subsets for allocation provided that no indication has been received from an adjacent network node that said subset should not be allocated.

The set of resources may be divided into predetermined subsets and a network node can allocate any one of the subsets where no indication has been received from an adjacent network node that it should not be allocated to edge user equipment.

When determining which user equipment are edge and which are centre user equipment a number of different methods can be performed which rank user equipment according to the attenuation of signal received from the network node. The attenuation of the signal may be determined from the strength of the signal received.

User equipment is considered to be towards the centre of a cell where the attenuation of the signal is low and towards an edge where the attenuation of the signal is high. The classification of a user equipment as either a centre or an edge user equipment can be based on a particular signal threshold value or it can be based on relative values such that a certain number or certain fraction of user equipment with the lowest attenuation are ranked as centre user equipment and those with the highest attenuation are ranked as edge user equipment.

An advantage of using a threshold value for ranking is that it can be arranged such that user equipment with attenuation above a certain value will always be ranked as edge user equipment and will therefore always be provided with the subset of resources that at least some of the adjacent network nodes cannot allocate to their edge user equipment. In this way, the use of a threshold value may provide some degree of assurance regarding the level of performance provided. However, depending on the level that the threshold is set at and on the number and location of user equipment within a particular cell, it may be that in some cells many user equipment are classified as edge user equipment and this may result in limited resource being available to other user equipment, leading to an increase in latency.

Where a predetermined fraction or a predetermined number of user equipment are designated as edge user equipment then it is more likely that the subset of resources available for these user equipment will be sufficient and there will be less occurrence of high latency in resource allocation.

In some embodiments, each of said subsets comprise a same number of resources and said step of determining said edge and said centre user equipment comprises designating a number of said user equipment with a highest degree of attenuation as said edge user equipment, said number being equal to said number of resources in said subset.

In some cases, in order for the subset of resources that at least some adjacent network nodes are not using for their edge user equipment to be allocated to the user equipment with the highest signal attenuation, a predetermined number of user equipment are classified as being edge user equipment and this number is set to be equal to the number of resources in each subset.

A second aspect of the present invention provides a method performed at a network 3o control node of allocating a set of orthogonal resources to user equipment within a network for transmitting signals to serving network nodes, said method comprising: providing network nodes within said network with one of at least two designations such that at least some adjacent network nodes have different designations; for network nodes of a same designation indicating to said network nodes a subset of said set of resources that are available to be allocated by said network node to edge user equipment that are located towards an edge of a cell of radio coverage provided by said network node, resources not allocated to said edge user equipment being available to be allocated by said network node to centre user equipment; wherein each network node of a different designation receives a different subset of resources, no resources from said set of resources being within more than one subset and resources allocated to said centre user equipment including resources allocated to edge user equipment by network nodes of a different designation.

The allocation of resources to user equipment may be performed at the network node as described in the first aspect with network nodes communicating with each other to indicate their allocations, it may also be performed centrally at a network control node, in some cases in the core network, and in this case the allocation is determined centrally and then provided to the different network nodes from the network control node.

Where the allocation is performed centrally then the network nodes are designated or classified such that at least some adjacent network nodes have different designation or classifications, network nodes with the same designation or classification being provided with the same subset of resources for their edge user equipment. This means that for at least some adjacent network nodes, edge user equipment will use different resources while centre user equipment may use the same resources as resources used by edge user equipment of a different network node.

In some embodiments, the method further comprises transmitting to said network nodes a threshold signal attenuation value, user equipment being defined as centre user equipment and edge user equipment according to a level of attenuation of signals received at said network node, said threshold signal attenuation value defining a threshold between user equipment considered to be edge user equipment and user equipment considered to be centre user equipment.

In other embodiments the method further comprises transmitting to said network 3o nodes one of: a fraction of user equipment to be considered edge user equipment; and a number of user equipment to be considered edge user equipment.

In some cases the methods may be such that all adjacent network nodes have different designations and thus no adjacent network node will have edge user equipment that use the same resources as edge user equipment of an adjacent network node.

Although, the set of resources may be divided in different ways, in some embodiments they are divided into predetermined subsets and thus, when allocating a subset of resources to a particular user equipment the subset allocated is one of the predetermined subsets.

In some embodiments the number of subsets is three or seven.

Although any number of subsets greater than two may provide improved performance, three or seven are numbers where owing to the topology of the system, a distance of one or more cells between cells which use the same subset of orthogonal resources for their edge user equipment may be provided.

The higher the number of subset the more likely it is that adjacent or close network nodes will not have the same resources allocated to their edge user equipment. However, the higher number of subsets there are the fewer resources within each subset and thus, the higher the chances that there are not sufficient resources for all user equipment designated edge user equipment and latency in allocating resources to edge user equipment increases. Thus, a compromise depending on the number of user equipment and the interference levels that can be tolerated is used to determine the number of subsets. Where there are seven subsets then generally not only will adjacent network nodes not cover the same subset of resources for their user equipment but the system can be arranged such that there are multiple cells between network nodes where edge user equipment have the same resources. In such a case it can be appreciated that interference or contamination of signals will be particularly low.

In some embodiments, each of said subsets comprises a same number of resources.

Although the subsets may be of different sizes, it may be advantageous for them to have the same number of resources as this will generally lead to a fairer division of resources between network nodes and thus, more efficient use of resources within the system.

In some embodiments, all of said resources not allocated to said edge user equipment are available for allocation to said centre user equipment.

Allowing all of the resources that are not allocated to the edge user equipment to be available for allocation to the centre user equipment increases the re-use of resources and provides for increased resource allocation.

In some embodiments, said resources are resources for transmission of said user equipment pilot signal.

Although this system may improve performance and reduce interference for many different signals transmitted from the user equipment towards the network node, it is particularly applicable for pilot signals. A network node does not have techniques available for disentangling pilot signals received from different user equipment using non-orthogonal resources. Thus, providing a system where contamination of signals is reduced is particularly advantageous for pilot signals. This technique is particularly advantageous in massive MIMO systems where many user equipment can be served by a network node and thereby capacity is greatly increased. However the separating and decoding of signals from individual user equipment that is performed by a massive MIMO system relies on the system knowing the channel properties of the individual user equipment. Thus, it is important that the channel estimation is accurate and to this end pilot signals from the user equipment are broadcast regularly and need to suffer low interference. Thus, resources to be allocated for transmission of such signals should be orthogonal where there is likely to be signal contamination from a nearby user equipment.

Embodiments, provide a way of increasing the availability of resources whilst reducing contamination in an effective and yet simple to implement manner.

A third aspect of the present invention provides a network node comprising classifying circuitry operable to classify user equipment within a radio cell of said network node as either edge user equipment, said edge user equipment being user equipment located towards an edge of said radio cell or centre user equipment, said centre user equipment being user equipment located towards a centre of said radio cell; resource allocating circuitry operable to allocate a subset of a set of resources, said set of resources comprising orthogonal resources for user equipment to transmit signals towards said network node, to said edge user equipment and to allocate resources from said set of resources that are not allocated to said edge user equipment to said centre user equipment; and transmission circuitry operable to transmit an indication to at least some adjacent network nodes that said subset of said resources is not available to said adjacent network node for allocation to edge user equipment.

In some embodiments, said set of resources is divided into predetermined subsets and said resource allocating circuitry is operable to select any one of said subsets for allocation provided that no indication has been received from an adjacent network node that said subset should not be allocated.

In some embodiments, said classifying circuitry is operable to classify said edge and said centre user equipment by determining whether an attenuation of a signal received at said network node from said user equipment passes a threshold value.

In some embodiments, said classifying circuitry is operable to classify said edge and said centre user equipment by ranking said user equipment according to a degree of attenuation of signals received from said user equipment and to classify a predetermined fraction of said user equipment ranked with a highest degree of attenuation as said edge user equipment.

In some embodiments, each of said subsets comprise a same number of resources and said classifying circuitry is operable to classify a number of said user equipment with a highest degree of attenuation as said edge user equipment, said number being equal to said number of resources in said subset.

A fourth aspect of present invention provides a network control node comprising designation circuitry operable to provide network nodes within said network with one of at least two designations such that at least some adjacent network nodes have different designations; resource allocation circuitry operable to allocate to network nodes having a same designation one subset of a set of resources, said set of resources comprising orthogonal resources for user equipment to transmit signals to serving network nodes, as resources available to be allocated by said network node to edge user equipment that are located towards an edge of a cell of radio coverage provided by said network node, resources not allocated to said edge user equipment being available to be allocated by said network node to centre user equipment; wherein said allocation is such that each network node of a different designation receives a different subset of resources, no resources from said set of resources being within more than one subset.

In some embodiments, said network control node further comprises transmission circuitry operable to transmit to said network nodes a threshold signal attenuation value, user equipment being defined as centre user equipment and edge user equipment according to a level of signal attenuation of signals received at said network node, said threshold signal attenuation value defining a threshold between user equipment considered to be edge user equipment and user equipment considered to be centre user equipment.

A fifth aspect of the present invention provides a computer program that when executed by processor is operable to control said processor to perform steps in a method according to a first or second aspect of the present invention.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which:

FIG. 6 schematically shows an example of pilot contamination for a cell-edge UE with location aware pilot reuse;

FIG. 7 schematically shows an example of pilot contamination for a cell-centre UE with location aware pilot reuse.

DESCRIPTION OF THE EMBODIMENTS

Figure 1:
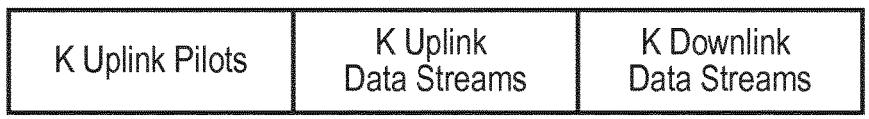
FIG. 1 illustrates training and data transmission phases in massive MIMO.

Before discussing the embodiments in any more detail, first an overview will be provided.

A way of providing orthogonal resources for user equipment to transmit signals towards a network node while mitigating interference effects particularly for the transmission of pilot signals are considered. Embodiments provide a location-aware pilot reuse (LA-PR) scheme that addresses the drawbacks of the problems that arise due to unrestricted pilot reuse or very restricted pilot reuse. The scheme relies on classifying UEs within a cell according to their location with regard to an edge of the cell and then restricting the resources that can be used by user equipment classified as cell edge user equipment while allowing unrestricted allocation of resource to user equipment classified as not being cell edge user equipment, that is those classified as being cell centre user equipment. The restriction on the allocation of resources to the cell edge user equipment involves cell edge user equipment from at least some adjacent or neighboring cells not being allocated the same resources from a set of orthogonal resources. In this regard it is recognized that those UEs towards an edge of a cell may be close to UEs at an edge of a neighbouring cell and as such restricting them from using resources that may be non-orthogonal avoids contamination between signals transmitted on these resources. Allowing centre UEs to use any resource from the set not allocated to another UE in that cell allows for efficient allocation of resource and recognizes that interference effects from such UEs with respect to UEs in other cells will be low.

A set of orthogonal resources are divided into a number of subsets, different subsets being allocated to different network nodes for use by their edge user equipment. When determining which network can allocate the same subset of resources to their edge UEs, network nodes may be considered as being classified with network nodes of a same classification allocating the same subset of resources to their edge UEs, while network nodes of a different classification allocate a different non-overlapping subset of resources to their UEs. The number of classifications will be at least two and corresponds to the number of subsets that a set of orthogonal resources are divided into. Network nodes are classified in such a way that neighbouring or adjacent cells of such network nodes are generally of a different classification such that their edge UEs do not share resources. Where there are a number of different classifications for the cells then all adjacent cells can have a different classification and signal contamination will be low. In embodiments, the set of resources is divided into a number of subsets which is equal to the number of different classifications of the cells. Thus, each classification is allocated a different subset of resources for their edge user equipment.

The classification of cells or network nodes and the allocation of subsets of resources may be done centrally at a central control node such as the core network, or it may be done at the network nodes, for example base stations, themselves, with communication between them indicating which subset of resources an adjacent network node should not allocate to their edge UEs, this being the subset that they have allocated to their own edge UEs.

Figure 2:
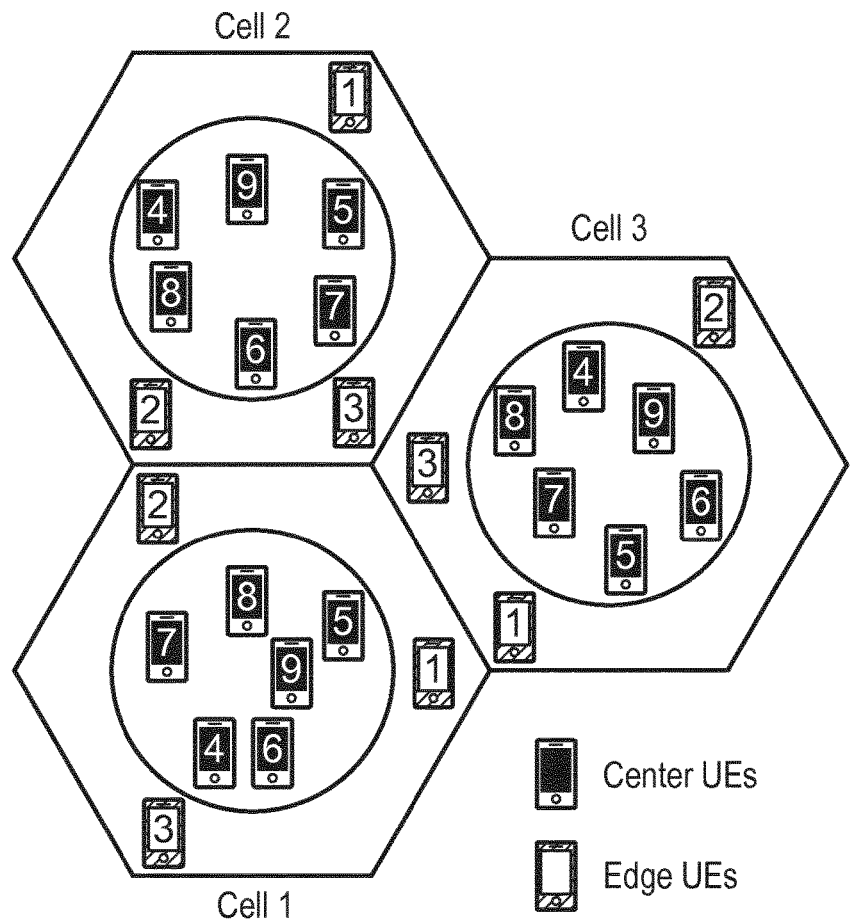
FIG. 2 illustrates the classification of user equipment as edge and center user equipment in adjacent cells according to an embodiment.
Figure 3:
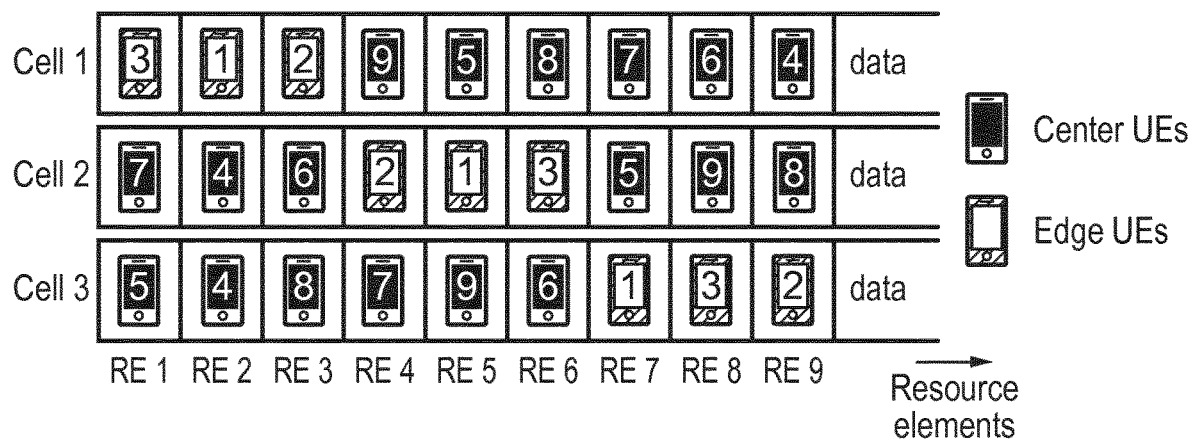
FIG. 3 illustrates the allocation of resources to the user equipment shown in FIG. 2 according to an embodiment.

FIGS. 2 and 3 provide an example of location aware pilot reuse LA-PR where a set of orthogonal pilots (REs) are divided into β, which in this case is 3, equal-sized subsets.

LA-PR allows centre UEs (UEs 4-9) of neighboring cells to reuse any pilot not used by the edge UEs (UEs 1-3). Thus, all cells can use all pilots awhile the amount of pilot contamination is kept low.

In embodiments the following basic steps are performed
In this embodiment, the designation of centre and edge UEs is performed in a fractional manner such that each BS divides the set of k scheduled UEs into two groups: (i) k/β UEs with the lowest average channel gain are designated as edge UEs, (so in this case 1/3 of UEs are designated as edge UEs) while (ii) k(β−1)/β UEs with the highest average channel gain are designated as centre UEs (in this case 2/3 of UEs). Other partitioning approaches may be used.

Just k orthogonal pilots are required to support k UEs per cell, since each cell uses all pilots. The set of k orthogonal pilots is divided into β subsets, each containing k/β pilots. Each subset is assigned to one BS for allocation to their edge user equipment, so that neighboring BSs have different subsets. This can be simply obtained for β=3, 4, 7, etc. Where β is 2 for example then some neighboring cells will use the same subset and interference levels may be higher.

As can be seen from FIG. 3 all resources may be used, but no edge user equipment from adjacent cells use the same resources. The steps above mean that neighboring BSs in general use different orthogonal resources for their pilots for their edge UEs, and thus, only receive interference from the cell-centre UEs of neighboring cells, which are further away.

Furthermore, as all resource elements can be used in each cell for pilot transmission, fewer REs need to be reserved for pilot transmission than is the case where there is restriction on their use; therefore more REs are available for data transmission.

The potential use of all REs means that channels of more UEs can be estimated during the training phase; hence more UEs can be simultaneously served on each RE during the data transmission phase.

System Model

Consider a massive MIMO cellular system, where each transmitting BS is equipped with a large number N of antennas, and can simultaneously serve k UEs through spatial multiplexing. While the number N is fixed, the value of k can be chosen adaptively by the scheduler.

In each cell, different UEs experience different average channel gains to/from the BS, due to the distance-dependent path loss and shadowing. For example, UEs located at the cell centre, i.e., close to the serving BS, have higher average channel gains. On the other hand, UEs located at the cell edge, i.e., far from the serving BS, have lower average channel gains.

In each cell, a scheduling algorithm chooses the set of k UEs to be served. For each scheduled UE, its previous average channel gain determines whether the UE is in the cell centre or at the cell edge. In particular, the k/β UEs with the lowest average channel gain corresponding to the highest average channel attenuation are denoted edge UEs, and the remaining k(β−1)/k UEs with the highest average channel gain and lowest average channel attenuation are denoted centre UEs. Other partitioning approaches may apply.

Example

A simple example of the above cell-centre/cell-edge classification is given in FIG. 2, for k=9 scheduled UEs per cell and for β=3. In the example, each BS divides the scheduled UEs into two groups: k/β=3 edge UEs (UEs 1-3) and k(β−1)/β=6 center UEs (UEs4-9).

The BS then assigns the respective subset of k/β pilots to its edge UEs, and assigns the remaining k(β−1)/β pilots to its center UEs. This ensures that neighboring BSs use different pilots for their edge UEs, and that they are only interfered by the cell-center UEs of neighboring cells, which are further away.

Figure 4:
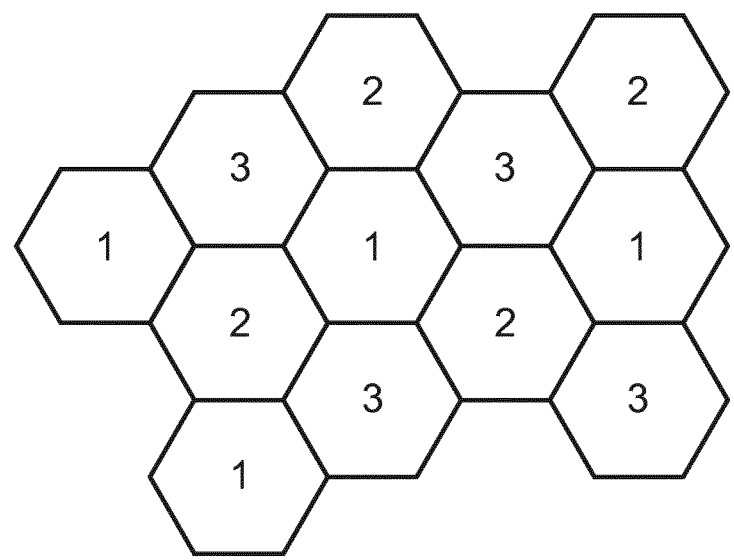
FIG. 4 shows the classification of adjacent cells when the resources are divided into three subsets.

FIG. 4 schematically shows how neighbouring cells can be arranged to receive different subsets of resources for their edge user equipment where β=3. In this figure the cells are shown schematically as being of a same size and having a hexagonal shape. It should be understood that cell size will vary between cells and the hexagonal shape is simply an approximation of the actual shape.

As can be seen, as β=3, then each cell can be classified in one of three different ways, each cell with a same classification being allocated the same subset of orthogonal resources for its edge users. The use of 3 as the number of subsets allows adjacent cells (where they are depicted as hexagons) not to have the same subset of orthogonal resources for their edge user equipment.

Figure 5:
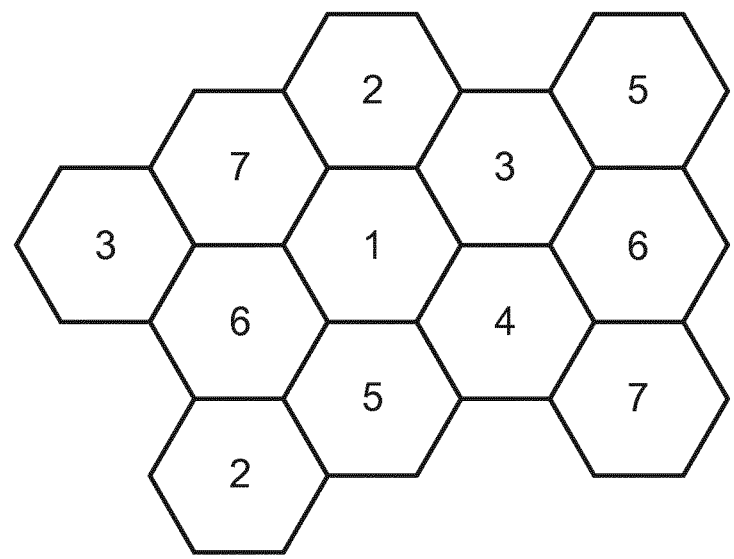
FIG. 5 shows the classification of adjacent cells when the resources are divided into seven subsets.

FIG. 5 shows a further example where the number of subsets β=7. In this case where a cell is schematically shown as being hexagonal each of the 6 cells adjacent to a particular cell can be classified differently not only to that cell but to each other. This results in there being at least two cells between cells being classified in the same way and therefore having the same subset of resources for their edge user equipment. Thus, in this case the interference between user equipment signals is even lower.

Pilot Contamination

The proposed location-aware pilot reuse scheme means that neighboring cells generally use different resource elements for their edge UEs' pilots. As a result:

Each edge UE receives pilot contamination only from neighboring centre UEs, which are located significantly further away. These pilot contamination contributions are therefore weak.

Pilot contamination from neighboring edge UEs only affects centre UEs, which are located close to the BS and are thus more protected towards such contamination.

Example

FIG. 6 shows an example of pilot contamination received by a cell-edge UE under the proposed LA-PR scheme. Only centre UEs of neighboring BSs interfere with the edge UE during the training phase. Since their distance is significantly larger, the resulting pilot contamination is weak.

FIG. 7 shows an example of pilot contamination received by a cell-centre UE under the proposed LA-PR scheme. The centre UE receives pilot contamination from some neighboring edge UEs. However, since the centre UE is located close to the serving BS, it is sufficiently protected from such contamination.

Figure 8:
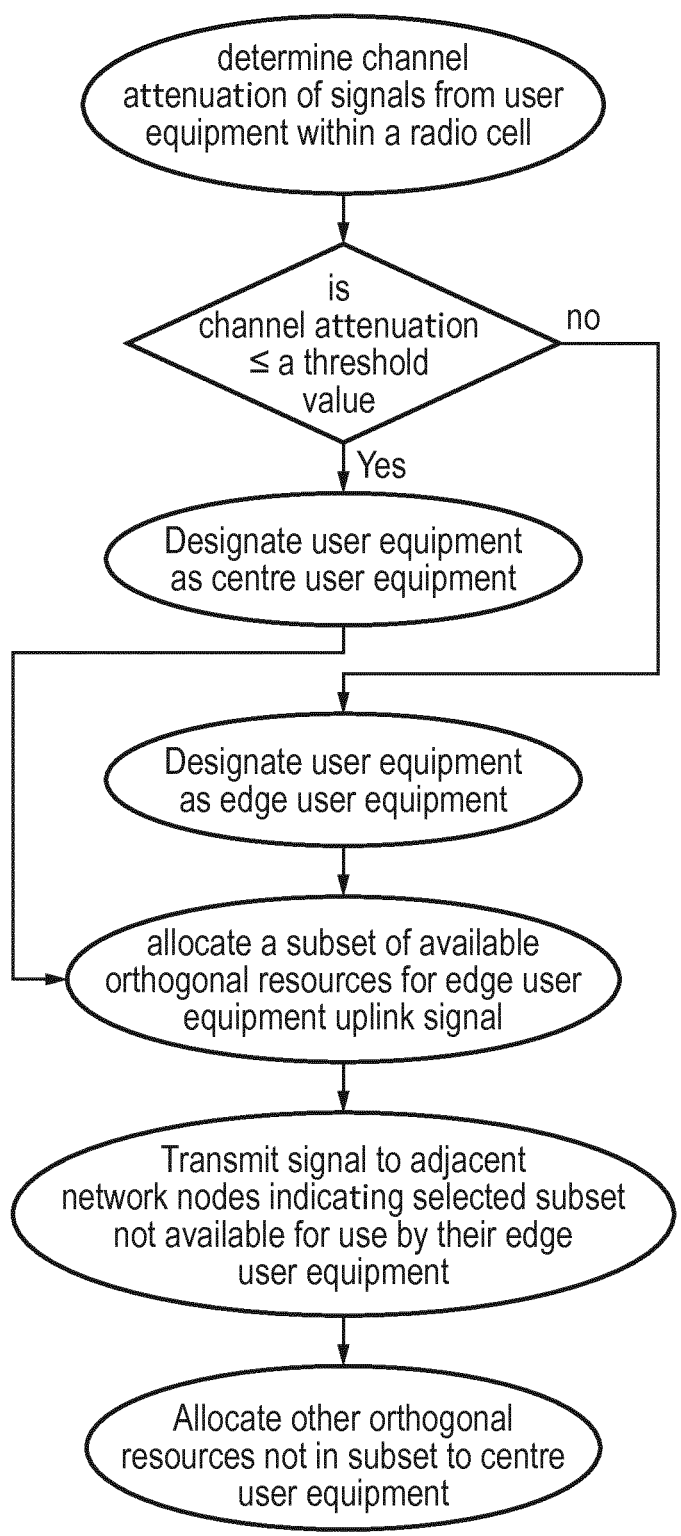
FIG. 8 shows a flow diagram a method performed at a network node according to an embodiment.

FIG. 8 shows a flow diagram schematically illustrating steps in a method according to an embodiment performed at network node. The channel attenuation or conversely the gain of the channel of different user equipment within the cell of the network node is determined and compared with a threshold value to determine which user equipment may be considered to be edge user equipment and which to be centre user equipment. In other embodiments rather than comparing the gain or attenuation with a threshold value, the relative values for the different user equipment may be compared and a certain fraction of the user equipment designated as centre and a further fraction as edge user equipment.

Once the user equipment have been so designated a subset of orthogonal resources that are available for use by the edge user equipment are selected and a different resource from the subset is allocated to each of the edge user equipment for use for transmission of an uplink signal. In other embodiments it may be for use for transmission of pilot signals. The subsets that are deemed to be available are those where no indication has been received from an adjacent network node that they are using that subset for their edge user equipment. The rest of the orthogonal resources not in that subset can then be allocated to the user equipment deemed centre user equipment.

The network node will also send an indication to adjacent network nodes that the subset that it has selected for its edge user equipment should not be used for their edge user equipment.

In summary, embodiments provide a method that allows for full reuse of resources for uplink communications and is particularly useful in allocating resources for pilots for massive MIMO systems.

In particular: an efficient full reuse of orthogonal resources across cells is provided. For a given number of available orthogonal resources, this allows each BS to estimate the maximum number of UEs' channels, and therefore to serve this number of UEs simultaneously via spatial multiplexing.

Embodiments control the amount of pilot contamination received by all UEs during the training phase, by ensuring that at least some interfering UEs from other cells lie at a sufficient distance. This allows network nodes to accurately estimate propagation channels to/from their UEs, and to exploit the potential of massive MIMO.

Embodiments provide a large throughput gain compared to existing solution. This is achieved by (i) using fewer REs for pilot or uplink transmission, which makes more REs available for other transmissions, and (ii) training more UEs per cell, which allows more UEs to be served on each data REs. The proposed intelligent allocation for the pilot or uplink resource elements reduces the interference such that pilot or uplink contamination remains minimal or at least small.

Embodiments are simple and scalable to a generic number of scheduled UEs per cell, and to various integer fractions of edge UEs. Moreover, the throughput gain increases with the number of BS antennas, since adding UEs becomes more beneficial for the sum-throughput.

Although embodiments are particularly applicable to pilot signals, embodiments may also be employed for uplink data transmissions, where each BS uses the whole set of available data REs, but neighboring BSs use different subsets for their edge UEs. This results in an improved spectral efficiency, while the amount of interference incurred by cell-edge UEs transmissions is controlled.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method performed at a network control node of allocating a set of orthogonal resources to user equipment within a network for transmitting signals to serving network nodes, said method comprising:
providing network nodes within said network with one of at least two designations such that at least some network nodes have a same designation and at least some adjacent network nodes adjacent to said some network nodes have different designations;
for said plurality of network nodes of a same designation indicating to said network nodes a subset of said set of orthogonal resources that are available to be allocated by a respective one of said network nodes to edge user equipment that are located towards a respective edge of a respective cell of radio coverage provided by said respective network node, only resources of said set of orthogonal resource that are not allocated to said edge user equipment being available to be allocated by said respective network node to centre user equipment that are located towards a centre of the cell of radio coverage provide by said respective network node; wherein
respective network nodes of different respective designations receive indications of different respective subsets of said set of orthogonal resources, no resources from said set of orthogonal resources being within more than one subset and wherein resources available for allocation to centre user equipment of a respective network node include resources allocated to edge user equipment by network nodes of a different designation from that of the respective network node.

2. A method according to claim 1, comprising transmitting to said network nodes a threshold signal attenuation value, user equipment being defined as centre user equipment and edge user equipment according to a level of signal attenuation of signals received at said network node, said threshold signal attenuation value defining a threshold between user equipment considered to be edge user equipment and user equipment considered to be centre user equipment.

3. A method according to claim 1, wherein said set is divided into at least two predetermined subsets.

4. A method according to claim 3, wherein said set is divided into three or seven subsets.

5. A method according to claim 3, wherein each of said subsets comprise a same number of resources.

6. A method according to claim 1, wherein all of said resources not allocated to said edge user equipment are available for allocation to said centre user equipment.

7. A method according to claim 1, wherein said resources are resources for transmission of said user equipment pilot signal.

8. A non-transitory computer readable medium comprising program instructions for causing a processor to perform at least a method according to claim 1.

9. A network control node comprising:
designation circuitry operable to provide network nodes within said network with one of at least two designations such that at least some network nodes have a same designation and at least some adjacent network nodes adjacent to said some network nodes have different designations;
resource allocation circuitry operable to allocate to network nodes having the same designation one subset of a set of resources, said set of resources comprising orthogonal resources for user equipment to transmit signals to serving network nodes, as resources available to be allocated by respective ones of said network nodes to edge user equipment that are located towards an edge of a respective cell of radio coverage provided by a respective network node, only resources not allocated to said edge user equipment of said respective network node being available to be allocated by said respective network node to centre user equipment that are located towards a centre of the cell of radio coverage provide by said respective network node; wherein
said allocation is such that each network node of a different designation receives a different subset of resources, no resources from said set of orthogonal resources being within more than one subset.

10. A network control node according to claim 9, further comprising transmission circuitry operable to transmit to said network nodes a threshold signal attenuation value, user equipment being defined as centre user equipment and edge user equipment according to a level of signal attenuation of signals received at said network node, said threshold signal attenuation value defining a threshold between user equipment considered to be edge user equipment and user equipment considered to be centre user equipment.

\* \* \* \* \*